Sept. 26, 1944. D. CURRIE 2,359,206
CULTIVATOR ATTACHMENT FOR TRACTORS
Filed Nov. 2, 1942 2 Sheets-Sheet 2
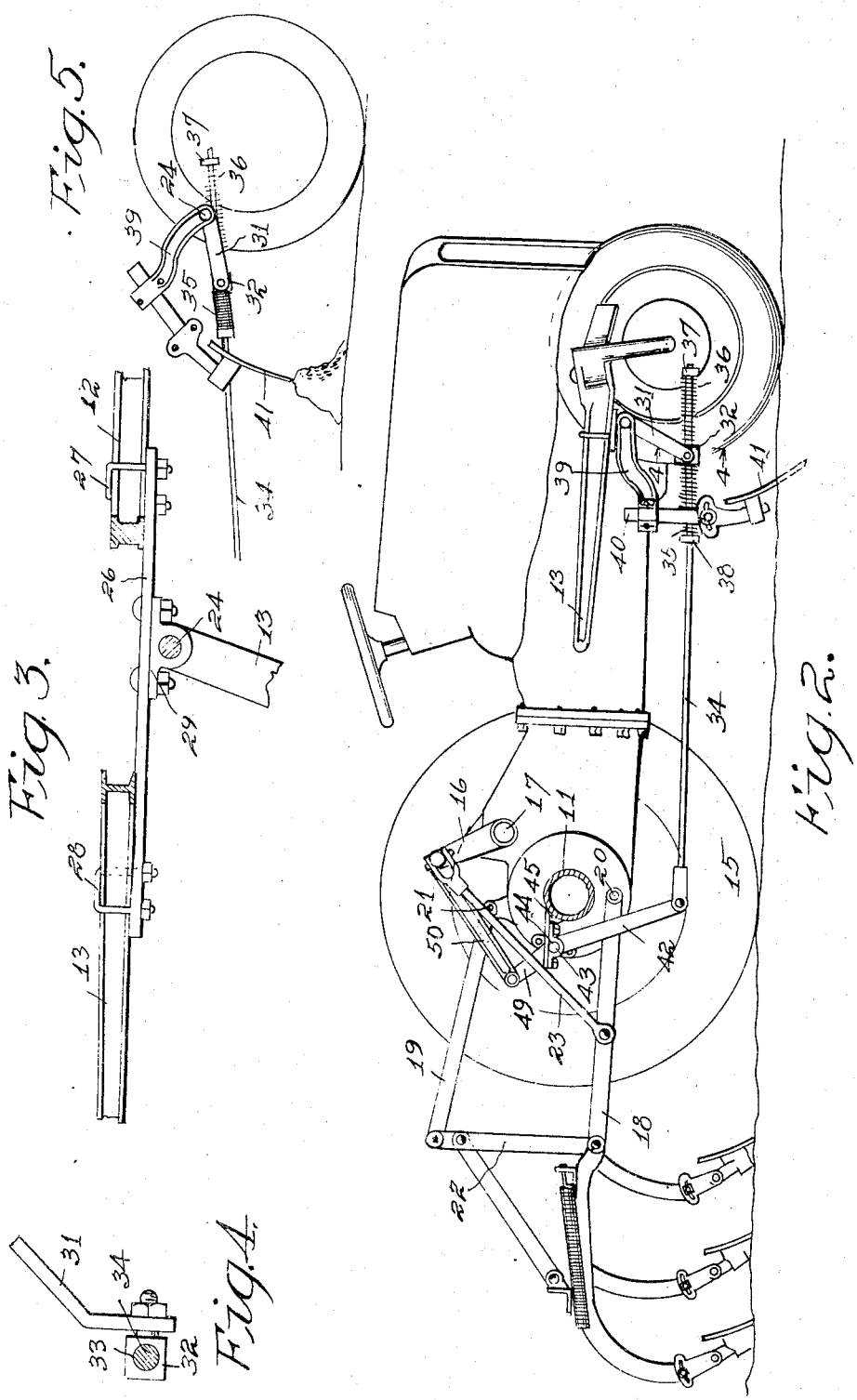
Inventor
Donald Currie
by Alfred G. Hague
atty Patented Sept. 26, 1944

2,359,206

UNITED STATES PATENT OFFICE 2,359,206

CULTIVATOR ATTACHMENT FOR TRACTORS

Donald Currie, Odebolt, Iowa

Application November 2, 1942, Serial No. 464,187

2 Claims. (Cl. 97—184)

This invention relates to a cultivator attachment particularly adapted to be applied to certain types of four wheel tractors having the cultivator attachment mounted back of the back or traction wheels. In this type of tractor difficulty has been experienced in cultivating rows of corn, or like plants, wherein some of the hills of the plants of the rows are offset or staggered relative to other plants in the row, inasmuch as the cultivating tools are back of the operator.

The object of my invention is to provide a cultivator device in the nature of an attachment which may be easily and quickly applied to the tractor without any alterations in the tractor structure, and with the use of ordinary tools, said attachment consisting of means for supporting a cultivator shovel on opposite sides of the row being cultivated and at points immediately behind the front wheels, wherein steering of the front wheels to move the forward end of the tractor transversely, will also move the shovels carried thereby transversely, these attached cultivator tools being preferably used in conjunction with some of the regular cultivator tools supported back of the tractor.

A further object of my invention is to provide in a cultivator attachment improved means for mounting the cultivator tools in such a manner that in case any of the tools should strike an obstruction such as a rock or stump, the tool may be swung to inoperative position automatically without danger of breaking the tool.

My invention consists in the construction, arrangement and combination of the various parts of the device, whereby the objects contemplated are attained, as hereinafter more fully set forth, pointed out in my claims, and illustrated in the accompanying drawings, in which:

Figure 2 is a top view of the same with a portion of the tractor being broken away to show the cultivator construction;

Figure 3 is a large detail sectional view taken on the line 3—3 of Figure 1;

Figure 4 is a detail sectional view taken on the line 4—4 of Figure 1; and

Figure 5 is a diagrammatical view illustrating the manner in which one of the cultivator tools is swung to an elevated position by the engagement with an obstruction.

Figure 1:
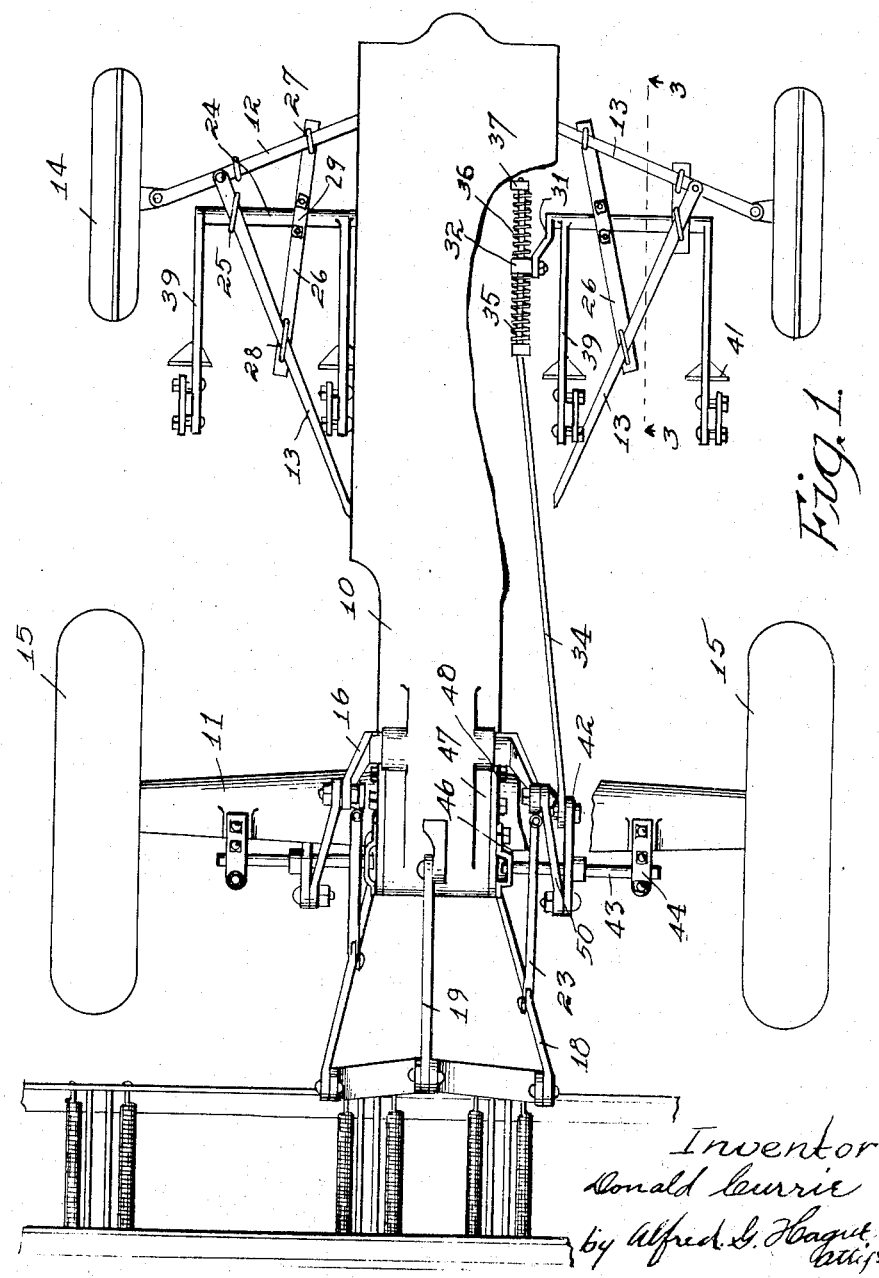
Figure 1 is a side elevation of a tractor with my improved cultivator attachment connected thereto, with one of the tractor wheels removed and a portion of the body and fender broken away.

The reference numeral 10 indicates the tractor body having a rear axle housing 11 and a front axle 12. Brace members 13 are provided having one end connected to the axle 12 and the other end to the body 10. The regular steering wheels 14 are mounted on the front axle, while traction wheels 15 support the rear axle. The tractor body 10 is also provided with a pair of upwardly and rearwardly inclined lifting arms 16 supported by a shaft 17, which in turn is caused to oscillate by means of hydraulically-operated mechanisms, not illustrated, and forming no part of this invention any other than to show means for raising and lowering the cultivator tools for my improved attachment.

The tractor is also provided with rearwardly extending levers 18 and 19, which are pivotally mounted at points 20 and 21 and are adapted to support a cultivator attachment 22, which is of ordinary construction, one of the levers 18 being operatively connected with a corresponding lever 16 by means of a link 23, thus providing means whereby the cultivator attachment 22 may be elevated and lowered by causing the arm 16 to be oscillated.

My improved attachment comprises a shaft 24 supported beneath the forward end of each of the braces 13 by means of a U bolt 25 and also by means of a bar 26 having one end secured to the axle 12 by a U bolt 27, and the other end connected to the brace 13 by means of a U bolt 28, the bar 26 having a bearing 29 for rotatably supporting the shaft 24 (Fig. 2). The inner end of the shaft 24 is provided with a downwardly and rearwardly extending rock arm 31, to which a block 32 is pivotally mounted at its lower end, said block being provided with an opening 33 for slidably receiving a link 34 (Figs. 1 and 4).

Adjacent to the back and front faces, respectively, of the block 32 are springs 35 and 36.

The forward end of the rod 34 has a nut 37 for engaging the front end of the spring 36, and a nut 38 for engaging the rear end of the spring 35.

The shaft 24 is also provided with rearwardly extending beams 39, having at their rear ends shanks 40 to which cultivator tools or shovels 41 are attached. By this arrangement it will be seen that if the link 34 is reciprocated, then the arm 31 will be oscillated and the shaft 24 rocked, causing the arms 39 to be rocked and the shovels 41 raised and lowered.

For actuating the link 34 I have provided a lever 42 supported on a shaft 43, which is mounted in a bearing 44 carried by a bracket 45 formed on the tractor axle 11 for the purpose of supporting the mud guard (Figs. 1 and 2). The inner end of the shaft 43 is supported in a bracket 46 carried by the side of the differential housing 47 by means of bolts securing the housing cap 48 in position. The lever 42 is provided with an upwardly extending portion 49, to which one end of a link 50 is connected, the other end of said link being connected to the upper end of the corresponding lever 16. By this arrangement it will be seen that as the levers 16 are swung in an anti-clockwise direction, as viewed in Figure 1, the links 50 will be moved downwardly causing the lower end of the lever 42 to be moved forwardly and with it the link 34, causing the shovels 41 to be lowered into the ground due to the tension of the spring 35. However, if the tractor is advanced and the lower end of one of the shovels 41 engages a rock or stump, the said lower end will swing upwardly and rearwardly causing the block 32 to be moved towards the nut 38, and the spring 35 to be compressed, as illustrated in Figure 5. In this connection it will be noted that the arm 31 has moved to position almost in alignment with the link 34, at which time the pivot of the block 32 is almost on dead center with the shaft 24 and the pivotal connection between the link 34 and the lever 42, so that the pressure necessary to maintain the shovel in said elevated position has been reduced to almost zero, due to the fact of the pivot 32 being near dead center. By this arrangement it will be seen that any tendency towards breaking the point off of the shovel is greatly reduced at such times as the shovel passes over the top of the obstruction, at the same time permitting a large amount of pressure being applied to move the shovel into the ground when the shovel is in its lowered and operative position.

It will further be seen that by mounting the shovels 41 on opposite sides of the row and near the front wheels, any steering movement of the forward end of the tractor to move transversely will also be transmitted to the said shovels so that the shovels may be made to dodge any hills staggered relative to the main row, and so positioned as to be easily observed by the operator handling the tractor, said shovels 41 being designed to pass close to the hills, while the shovels mounted on the member 22 pass in between the rows at distances further away from the hills.

It will further be seen that I have provided a cultivator attachment which may be easily and quickly applied to that type of tractor employing two front wheels and a rear cultivator lifting mechanism wherein the lifting mechanism may also be employed for lifting the forward shovels of my improved attachment, the attachment having means to provide for its assembly on the tractor without alteration of the tractor frame.

I claim as my invention:

1. A cultivator including a horizontal rock shaft rotatably supported transversely of said cultivator, a beam fixed to said shaft and extending rearwardly therefrom, a tool-supporting shank fixed to and depending from the rear end of said beam, a cultivator tool carried adjacent the lower end of said shank, a rock arm fixed to said shaft and extending downwardly and rearwardly therefrom, a reciprocally movable operating link extended transversely of said shaft, a block slidably mounted on said link, means pivoting the block adjacent the lower end of said rock arm, and means yieldably limiting the movement of said link relative to said block whereby the cultivator tool may be moved to elevated and lowered positions by reciprocating the link and the tool yieldably maintained in the ground at a lowered position, said rock arm and said link, when said tool engages an obstruction on the ground, being moved against the pressure of said yieldable means upwardly toward a position in which said rock arm and said link are in substantial alignment with each other.

2. A cultivator including a rock shaft, means rotatably supporting said rock shaft in a direction transversely of the cultivator, shovel-supporting means including a member carried on said shaft and extended rearwardly therefrom, a rocker arm mounted on said shaft in angularly and laterally spaced relation with said rearwardly extended member, a reciprocally movable actuating link for elevating and lowering said shovel-supporting means extended transversely of said shaft, means pivoted to the free end of said rocker arm and slidably movable on said link, and yieldable means on said link to each side of said pivoted means for yieldably limiting the slidable movement of said pivoted means, said rocker arm being out of alignment with said link when said supporting means is in lowered position, said rocker arm being moved toward substantial alignment with said link when a shovel strikes an obstruction which causes said supporting means to be forced upward.

DONALD CURRIE.